(12) United States Patent
Nguyen

(10) Patent No.: US 11,188,105 B2
(45) Date of Patent: Nov. 30, 2021

(54) ELECTRICAL CIRCUIT FOR PRE-REGULATION POWER MANAGEMENT

(71) Applicant: Smart Prong Technologies, Inc., Irvine, CA (US)

(72) Inventor: Hoa Nguyen, Cerritos, CA (US)

(73) Assignee: SMART PRONG TECHNOLOGIES, INC., Irvine, CA (US)

( * ) Notice: Subject to any disclaimer, the term of this patent is extended or adjusted under 35 U.S.C. 154(b) by 552 days.

(21) Appl. No.: 16/156,781

(22) Filed: Oct. 10, 2018

(65) Prior Publication Data

US 2020/0117224 A1    Apr. 16, 2020

(51) Int. Cl.
| | |
|---|---|
| *G05F 1/46* | (2006.01) |
| *G05F 1/569* | (2006.01) |
| *H02M 1/36* | (2007.01) |
| *H02M 1/00* | (2006.01) |
| *G05F 1/56* | (2006.01) |

(52) U.S. Cl.
CPC .............. *G05F 1/468* (2013.01); *G05F 1/569* (2013.01); *H02M 1/0045* (2021.05); *H02M 1/36* (2013.01); *G05F 1/56* (2013.01); *H02M 1/0025* (2021.05)

(58) Field of Classification Search
CPC ... G05F 1/46; G05F 1/468; G05F 1/56; G05F 1/563; G05F 1/565; G05F 1/569; G05F 1/61; G05F 1/613; G05F 1/614; G05F 1/66; H02M 1/0022; H02M 1/0025; H02M 1/0045; H02M 1/0067; H02M 1/007; H02M 1/0083; H02M 1/0093; H02M 1/36; H02M 3/155; H02M 3/156; H02M 3/1563; H02M 3/157; H02M 3/158; H02M 3/1584

See application file for complete search history.

(56) References Cited

U.S. PATENT DOCUMENTS

| | | | | |
|---|---|---|---|---|
| 6,661,211 | B1 * | 12/2003 | Currelly | .............. H02M 3/1584 323/268 |
| 8,102,168 | B1 * | 1/2012 | Wong | ......................... G05F 1/56 323/314 |
| 10,224,805 | B1 * | 3/2019 | Young | .............. G01R 19/16528 |
| 2006/0158165 | A1 * | 7/2006 | Inn | ....................... H02M 3/1588 323/280 |
| 2008/0238376 | A1 * | 10/2008 | Zolfaghari | .............. G05F 1/575 323/234 |

(Continued)

*Primary Examiner* — Alex Torres-Rivera
*Assistant Examiner* — David A. Singh
(74) *Attorney, Agent, or Firm* — Viering, Jentschura & Partner Mbb

(57) ABSTRACT

A system may include a switch, a multiple stage voltage converter, and a regulation circuit. The switch may generate a pre-regulation signal based on an input signal. The multiple stage voltage converter may generate an output signal based on the input signal using a clock. The regulation circuit may generate a regulation signal based on the output signal and may generate a clock reference based on at least one of the pre-regulation signal and the regulation signal. The regulation circuit may generate the clock based on at least one of the pre-regulation signal, the regulation signal, and the clock reference and determine whether a voltage level of the regulation signal is within a range. If the voltage level of the regulation signal is within the range, the regulation circuit may generate a switch signal. The switch may adjust a voltage level of the pre-regulation signal based on the switch signal.

20 Claims, 4 Drawing Sheets

(56) References Cited

U.S. PATENT DOCUMENTS

| | | | |
|---|---|---|---|
| 2010/0253301 A1* | 10/2010 | Nakada | H02M 1/08 323/282 |
| 2011/0050198 A1* | 3/2011 | Dong | G05F 3/242 323/315 |
| 2013/0147446 A1* | 6/2013 | Kris | G06F 1/26 323/273 |
| 2015/0372592 A1* | 12/2015 | Floyd | H02M 3/07 327/536 |
| 2017/0279350 A1* | 9/2017 | Liu | H02M 3/07 |
| 2017/0331277 A1* | 11/2017 | Summer | H02H 5/04 |
| 2018/0275704 A1* | 9/2018 | Li | G05F 1/573 |

* cited by examiner

ELECTRICAL CIRCUIT FOR PRE-REGULATION POWER MANAGEMENT

FIELD

The embodiments discussed in the present disclosure are related to pre-regulation power management within an electronic device.

BACKGROUND

The use of electronic devices is a useful tool for work, personal, and entertainment uses. Despite the proliferation of electronic devices, there still remains various limitations for delivering power to electronic devices. Components within a system may use one or more clock signals for driving components to deliver power to an electronic device. During power up of the system, the clock signals may be unregulated, which may cause errors during power up or create a delay between power up of the system and delivery of power to the electronic device.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a system for pre-regulation power management. The system may include a switching circuit. The switching circuit may be configured to receive an input signal. The switching circuit may also be configured to generate a pre-regulation input signal based on the input signal. The system may also include a multiple stage voltage converter. The multiple stage voltage converter may be configured to receive a clock signal and an input signal. The multiple stage voltage converter may also be configured to generate an output signal based on the input signal using the clock signal. Additionally, the system may include a regulation circuit electrically coupled to the switching circuit and the multiple stage voltage converter. The regulation circuit may be configured to receive the output signal and the pre-regulation input signal. The regulation circuit may also be configured to generate a regulation signal based on the output signal. Additionally, the regulation circuit may be configured to generate a clock reference signal based on at least one of the pre-regulation input signal and the regulation signal. The regulation circuit may be configured to generate a clock signal based on at least one of the pre-regulation input signal, the regulation signal, and the clock reference signal. The regulation circuit may also be configured to determine whether a voltage level of the regulation signal is within a voltage range. If the voltage level of the regulation signal is within the voltage range, the regulation circuit may be configured to generate a switch control signal. The switching circuit may be configured to receive the switch control signal and to adjust a voltage level of the pre-regulation input signal based on the switch control signal.

One or more embodiments of the present disclosure may include a method of pre-regulation power management. The method may include receiving an input signal. The method may also include generating a regulation signal and a pre-regulation input signal based on the input signal. Additionally, the method may include generating a clock signal based on at least one of the pre-regulation input signal and the regulation signal. The method may include generating an output signal based on the input signal using the clock signal, wherein the regulation signal is based on the output signal. The method may also include determining whether a voltage level of the regulation signal is within a voltage range. In response to the voltage level of the regulation signal being within the voltage range, the method may include adjusting a voltage level of the pre-regulation input signal.

One or more embodiments of the present disclosure may include a system for pre-regulation power management. The system may include a first switching circuit. The first switching circuit may be configured to receive an input signal. The first switching circuit may also be configured to generate a pre-regulation input signal based on the input signal. The system may also include an oscillator. The oscillator may be electrically coupled to the first switching circuit. The oscillator may be configured to receive a clock reference signal, the pre-regulation input signal, and a regulation signal. The oscillator may also be configured to generate a clock signal based on at least one of the pre-regulation input signal, the regulation signal, and the clock reference signal. Additionally, the system may include a bandgap reference (BGR) circuit. The BGR circuit may be electrically coupled to the oscillator and the first switching circuit. The BGR circuit may be configured to receive the regulation signal and the pre-regulation input signal. The BGR circuit may also be configured to generate the clock reference signal based on at least one of the pre-regulation input signal and the regulation signal. Additionally, the BGR circuit may be configured to generate an under voltage lockout (UVLO) reference signal and a low dropout regulator (LDO) reference signal based on the regulation signal.

The system may include a multiple stage voltage converter. The multiple stage voltage converter may be electrically coupled to the oscillator. The multiple stage voltage converter may be configured to receive the clock signal and the input signal. The multiple stage voltage converter may also be configured to generate an output signal based on the input signal using the clock signal. The system may also include a LDO circuit. The LDO circuit may be electrically coupled to the multiple stage voltage converter, the BGR circuit, and the oscillator. The LDO circuit may be configured to receive the output signal and the LDO reference signal. The LDO circuit may also be configured to generate the regulation signal based on the output signal and the LDO reference signal. Additionally, the system may include a UVLO circuit. The UVLO circuit may be configured to receive the UVLO reference signal and the regulation signal. The UVLO circuit may also be configured to determine whether a voltage level of the regulation signal is within a voltage range. In response to the voltage level of the regulation signal being within the voltage range, the UVLO circuit may be configured to generate a switch control signal. The system may include a second switching circuit. The second switching circuit may be electrically coupled to the UVLO circuit and the first switching circuit. The second switching circuit may be configured to receive the switch control signal. The second switching circuit may also be configured to generate a second switch control signal. The first switching circuit may be configured to receive the second switch control signal and adjust a voltage level of the pre-regulation input signal based on the second switch control signal.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Figure 1:
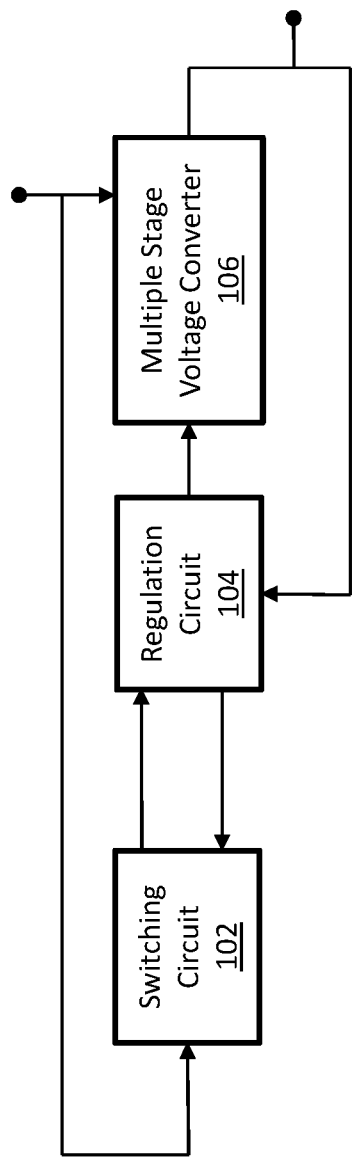
FIG. 1 illustrates an example system of electrical components implementing pre-regulation power management.

Systems for delivering power to an electronic device may include a voltage converter, a low dropout regulator (LDO) circuit, an oscillator, and a bandgap reference (BGR) circuit. The LDO circuit, the BGR circuit, and the voltage converter may operate in either a pre-regulation state (e.g., initialization of components within the system during power up) or a regulated state (e.g., steady state of components within the system after power up). The oscillator may generate a clock signal based on a clock reference signal generated by the BGR circuit. The voltage converter may operate using the clock signal. In the pre-regulation state, some conventional systems may either operate with errors due to the clock signal being unregulated or may wait a period of time for the clock signal to become regulated before delivering power to an electronic device.

Additionally, in some conventional systems, a single input signal may be received. The single input signal may be used to power up reference components within the system (e.g., components that generate clock signals and/or reference signals) and used by other components (e.g., the voltage converter may convert a voltage level of the single input signal) to deliver power to an electronic device. In these conventional systems, the BGR circuit may generate the clock reference signal based on a regulation signal generated by the LDO circuit. Furthermore, the LDO circuit may generate the regulation signal based on the clock reference signal. Therefore, in these conventional systems, the clock reference signal and the regulation signal may be looped on each other (e.g. dependent on each other). Looping the clock reference signal and the regulation signal may cause a voltage level of the regulation signal and the clock reference signal to vary up and down significantly, which may cause the clock signal to also vary up and down. Additionally, the fluctuation in voltage level of the regulation signal and the clock reference signal may create power that needs to be dissipated since these conventional systems are not yet operational in the pre-regulation state. Thus, these conventional systems may be slow to reach the regulated state and may dissipate a significant amount of power.

Furthermore, in some conventional systems, multiple input signals may be received. One or more of the input signals may be used to power up the reference components within the systems. Likewise, one or more other input signals may be used by other components to deliver power to an electronic device. In these conventional systems, the regulation signal generated by the LDO circuit and the clock reference signal generated by the BGR may not be looped. Instead, the multiple input signals may use multiple traces on a printed circuit board (PCB) and/or multiples wires within the systems. Therefore, these conventional systems may include a larger footprint than single input signal systems and/or an increased cost and complexity to produce.

Embodiments described in the present disclosure are directed to improvements in pre-regulation power management within a system that receives a single input signal. The input signal may be used to power up reference components within the system and by other components to deliver power to an electronic device. For example, the system may include a switching circuit, a regulation circuit, and a multiple stage voltage converter. The switching circuit may receive an input signal (e.g., the single input signal). The switching circuit may generate a pre-regulation input signal based on the input signal.

The regulation circuit may receive the pre-regulation input signal and an output signal. The regulation circuit may generate a regulation signal based on the output signal. Additionally, the regulation circuit may generate a clock reference signal based on the pre-regulation input signal and/or the regulation signal. The regulation circuit may also generate a clock signal based on the pre-regulation input signal, the regulation signal, and/or the clock reference signal.

The multiple stage voltage converter may receive the input signal (e.g., the single input signal). The multiple stage voltage converter may generate the output signal based on the input signal using the clock signal.

The regulation circuit may determine whether a voltage level of the regulation signal is within a voltage range. In response to the voltage level of the regulation signal being within the voltage range, the regulation circuit may generate a switch control signal. The switching circuit may receive the switch control signal. The switching circuit may adjust a voltage level of the pre-regulation input signal based on the switch control signal. For example, the voltage level of the pre-regulation input signal may be adjusted to substantially zero volts. The system may be operating in the regulated state (e.g., the steady state) when the voltage level of the pre-regulation input signal is adjusted (e.g., adjusted to substantially zero volts).

At least some embodiments described in the present disclosure may reduce an amount of time needed for the system to be operational by reducing an amount of variance in the voltage level of the regulation signal and consequently the clock signal in the pre-regulation state. Furthermore, at least some embodiments described in the present disclosure may include a reduced circuit footprint compared to conventional systems that receive multiple input signals. Additionally, at least some embodiments described in the present disclosure may dissipate less power since the amount of variance in the voltage level of the regulation signal and consequently the clock signal in the pre-regulation state may be reduced and because embodiments described in the present disclosure may reduce an amount of time needed to be operational (e.g., embodiments described in the present disclosure may reduce an amount of time the various signals are not being used in an operational state).

Embodiments of the present disclosure are explained with reference to the accompanying drawings.

FIG. 1 illustrates an example system 100 of electrical components implementing pre-regulation power management, in accordance with one or more embodiments of the present disclosure. The system 100 may include a switching circuit 102, a regulation circuit 104, and a multiple stage voltage converter 106. The system 100 may operate in either a pre-regulation state (e.g., initialization of components within the system 100 during power up) or a regulated state (e.g., a regulated state of components within the system 100 after power up). The regulated state may be the same or similar to a steady state of operation.

The switching circuit 102 may be electrically coupled to the regulation circuit 104 and an input line. The switching circuit 102 may be configured to transition between a closed position and an open position. In the closed position, the switching circuit 102 may generate a pre-regulation input signal. In the open position, the switching circuit 102 may not generate the pre-regulation input signal. The switching circuit 102 may receive an input signal via the input line. The pre-regulation input signal may be based on the input signal. In some embodiments, the pre-regulation input signal may not be regulated.

The regulation circuit 104 may be electrically coupled to the switching circuit 102 and the multiple stage voltage converter 106. The regulation circuit 104 may be configured to receive the pre-regulation input signal. Likewise, the regulation circuit 104 may be configured to receive an output signal. The regulation circuit 104 may generate a regulation signal based on the output signal.

The regulation circuit 104 may generate a clock reference signal based on the pre-regulation input signal and/or the regulation signal. In some embodiments, in the pre-regulation state, the regulation signal may be substantially zero volts and the clock reference signal may be based solely on the pre-regulation signal. As another example, while the system 100 is transitioning from the pre-regulation state to the regulated state, the clock reference signal may be based on a summation of the regulation signal and the pre-regulation input signal. As yet another example, in the regulated state, the clock reference signal may be based solely on the regulation signal.

The regulation circuit 104 may generate a clock signal based on the pre-regulation input signal, the regulation signal, and/or the clock reference signal. The clock signal may be an alternating current (AC) signal with a frequency and/or a voltage level based on the pre-regulation input signal, the regulation signal, and/or the clock reference signal. In some embodiments, if a voltage level of the pre-regulation signal and/or the regulation signal increases, the frequency/voltage level of the clock signal may increase. In other embodiments, if the voltage level of the regulation signal and/or the pre-regulation signal decreases, the frequency/voltage level of the clock signal may decrease.

The pre-regulation input signal and/or the regulation signal may be used to generate the clock signal within a particular voltage range and/or frequency during power up of the system 100. In some embodiments, the voltage level of the clock signal may be between substantially 4.5 volts and substantially 5.5 volts. In other embodiments, the voltage level of the clock signal may be between substantially four volts and substantially six volts. In some embodiments, the frequency of the clock signal may be between substantially two hundred hertz (Hz) and substantially five hundred megahertz (MHz). For example, the frequency of the clock signal may be substantially two hundred kilohertz (kHz).

The multiple stage voltage converter 106 may be electrically coupled to the regulation circuit 104 and the input line. The multiple stage voltage converter 106 may receive the clock signal and the input signal. The input signal may be at a first voltage level. The clock signal may drive components within the multiple stage voltage converter 106. The multiple stage voltage converter 106 may include two or more stages of voltage conversion. Each stage of the multiple stage voltage converter 106 may generate a signal at a voltage level that is lower than a voltage level of a signal received by the particular stage of the multiple stage voltage converter. An example of the multiple stage voltage converter 106 is described in U.S. Pat. No. 9,673,717, entitled "Electrical Circuit For Delivering Power To Consumer Electronic Devices," filed on Jan. 15, 2016, which is incorporated in the present disclosure by reference in its entirety.

The multiple stage voltage converter 106 may generate the output signal at a second voltage level that may be lower than the first voltage level. The output signal may be provided to an external electronic device and the regulation circuit 104.

The regulation circuit 104 may receive the output signal. Additionally, the regulation circuit 104 may generate the regulation signal based on the output signal. In some embodiments, the regulation signal may be a voltage signal. For example, a voltage level of the regulation signal may be based on the second voltage level of the output signal. In some embodiments, in the pre-regulation state, the output signal may be equal to substantially zero volts, which may cause the regulation signal to be equal to substantially zero volts. In other embodiments, in the regulated state or while the system 100 is transitioning from the pre-regulation state to the regulated state, the output signal may be greater than zero volts, which may cause the regulation signal to be greater than zero volts.

Additionally, the regulation circuit 104 may determine whether a voltage level of the regulation signal is within a voltage range. For example, the voltage range may be between substantially 4.2 volts and substantially 4.5 volts. In some embodiments, the voltage range may include values less than 4.2 volts and/or greater than 4.5 volts. If the voltage level of the regulation signal is within the voltage range, the regulation circuit 104 may generate a switch control signal.

The switching circuit 102 may receive the switch control signal. The switching circuit 102, in response to receiving the switch control signal, may adjust a voltage level of the pre-regulation input signal. For example, the switching circuit 102 may transition to the open position and may not provide the pre-regulation input signal (e.g., the voltage level of the pre-regulation input signal may be adjusted to substantially zero volts). If the voltage level of the pre-regulation input signal is adjusted to substantially zero volts, the system 100 may be operating in the regulated state and the regulation circuit 104 may generate the clock reference signal based solely on the regulation signal. In addition, the regulation circuit 104 may generate the clock signal based on the regulation signal and the clock reference signal.

Modifications, additions, or omissions may be made to FIG. 1 without departing from the scope of the present disclosure. For example, while the system 100 is illustrated as including a single switching circuit 102, the system 100 may include any number of switching circuits 102, such as two switching circuits 102 or five switching circuits 102. As another example, while the system 100 is illustrated as including a single regulation circuit 104, the system 100 may include any number of regulation circuits 104, such as three regulation circuits 104 or seven regulation circuits 104. As an additional example, while the system 100 is illustrated as including a single multiple stage voltage converter 106, the system 100 may include any number of multiple stage voltage converters 106, such as two multiple stage voltage converters 106 or nine multiple stage voltage converters 106.

Figure 2:
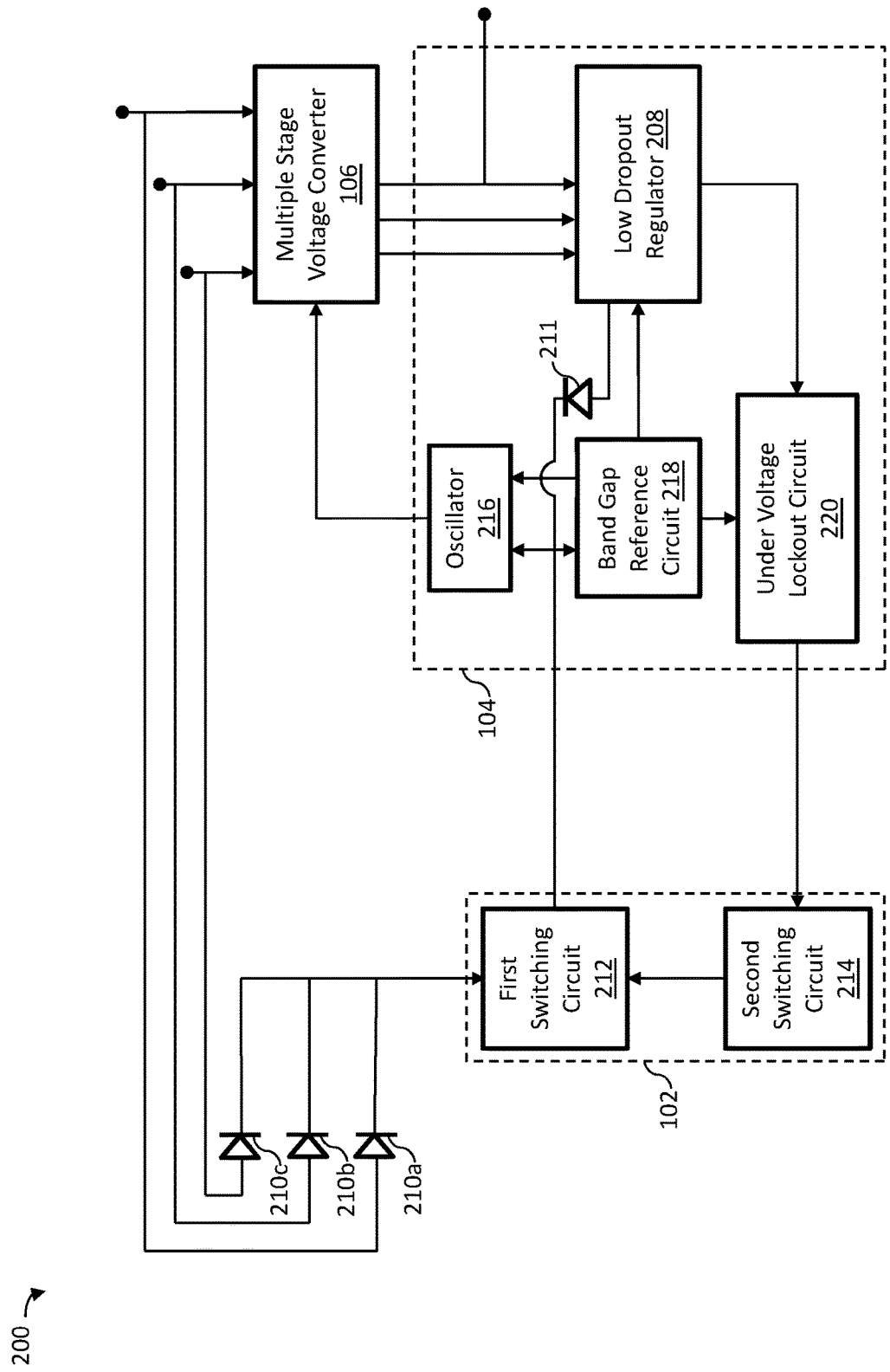
FIG. 2 illustrates another example system of electrical components implementing pre-regulation power management.

FIG. 2 illustrates another example system 200 of electrical components implementing pre-regulation power management, in accordance with one or more embodiments of the present disclosure. The system 200 may include a switching circuit 102, a regulation circuit 104, and a multiple stage voltage converter 106. The switching circuit 102 may be the same or similar to the switching circuit 102 discussed above in relation to FIG. 1. Additionally, the regulation circuit 104 may be the same or similar to the regulation circuit 104 discussed above in relation to FIG. 1. Also, the multiple stage voltage converter 106 may be the same or similar to the multiple stage voltage converter 106 discussed above in relation to FIG. 1. Additionally, the system 200 may include a first diode 210*a*, a second diode 210*b*, and a third diode 210*c* (collectively 'diodes 210'). In some embodiments, the diodes 210 may include high reverse breakdown voltage. For example, the diodes 210 may be rated for forty volts. As another example, the diodes 210 may be rated for greater than forty volts. For example, the diodes 210 may be rated for sixty volts. The diodes 210 may include any appropriate diode.

The switching circuit 102 may include a first switching circuit 212 and a second switching circuit 214. The regulation circuit 104 may include an oscillator 216, a bandgap reference (BGR) circuit 218, an LDO circuit 208, a regulation diode 211, and an under voltage lockout (UVLO) circuit 220. The regulation diode 211 may include a Schottky diode, a Zener diode, or any other appropriate diode.

The first switching circuit 212 may be electrically coupled to the BGR circuit 218, the oscillator 216, and the second switching circuit 214. Additionally, the first switching circuit 212 may be electrically coupled to the diodes 210 (e.g., electrically coupled to a cathode end of the diodes 210). The first switching circuit 212 may be configured to transition between a closed position and an open position. In the closed position, the first switching circuit 212 may generate a pre-regulation input signal. In the open position, the first switching circuit 212 may not generate the pre-regulation input signal.

The first switching circuit 212 may receive an input signal. The pre-regulation input signal may be based on the input signal. Additionally, the pre-regulation input signal may be a direct current (DC) signal at a voltage level that is the same or substantially similar to the voltage level of the input signal.

The BGR circuit 218 may receive the pre-regulation input signal and a regulation signal. The BGR circuit 218 may generate a clock reference signal based on the pre-regulation input signal and/or the regulation signal. In some embodiments, in the pre-regulation state, the regulation signal may be substantially zero volts and the clock reference signal may be based solely on the pre-regulation signal. As another example, while the system 100 is transitioning from the pre-regulation state to the regulated state, the clock reference signal may be based on a summation of the regulation signal and the pre-regulation input signal. As yet another example, in the regulated state, the clock reference signal may be based solely on the regulation signal. A voltage level of the clock reference signal may be based on a voltage level of the regulation signal and/or the pre-regulation input signal.

The oscillator 216 may be electrically coupled to the BGR circuit 218 and the multiple stage voltage converter 106. The oscillator 216 may receive the pre-regulation input signal and/or the regulation signal. Additionally, the oscillator 216 may receive the clock reference signal. The oscillator 216 may generate a clock signal based on the pre-regulation input signal, the regulation signal, and/or the clock reference signal. The clock signal may be an alternating current (AC) signal used to drive components in the multiple stage voltage converter 106. In some embodiments, a frequency and/or a voltage level of the clock signal may be based on the pre-regulation input signal, the regulation signal, and/or the clock reference signal as discussed above in relation to FIG. 1.

The multiple stage voltage converter 106 may be electrically coupled to the LDO circuit 208. Additionally, the multiple stage voltage converter 106 may be electrically coupled to one or more input lines. The multiple stage voltage converter 106 may receive the clock signal and the input signal. The input signal may be an unregulated signal at a first voltage level. The multiple stage voltage converter 106 may generate the output signal at a second voltage level based on the input signal using the clock signal. In some embodiments, the second voltage level may be lower than the first voltage level.

Furthermore, the multiple stage voltage converter 106 may generate a first intermediate signal at a third voltage level and a second intermediate signal at a fourth voltage level using the clock signal. The first intermediate signal may be generated by a first stage of the multiple stage voltage converter 106. Additionally, the second intermediate signal may be generated by a second stage of the multiple stage voltage converter 106. Likewise, the output signal (e.g., a third intermediate signal) may be generated by a third stage of the multiple stage voltage converter 106. The third voltage level, the fourth voltage level, and the second voltage level may each be incrementally less than the preceding voltage level. For example, the first voltage level of the input signal may be substantially forty eight volts, the third voltage level of the first intermediate signal may be substantially twenty four volts, the fourth voltage level of the second intermediate signal may be substantially twelve volts, and the second voltage level of the output signal may be substantially six volts. The output signal may be received by an external electronic device.

The LDO circuit 208 may be electrically coupled to the UVLO circuit 220 and an anode end of the regulation diode 211. A cathode end of the regulation diode 211 may be electrically coupled to the oscillator 216 and the BGR circuit 218. The LDO circuit 208 may receive one or more of the first intermediate signal, the second intermediate signal, and/or the output signal. Additionally, the LDO circuit 208 may receive an LDO reference signal. The LDO circuit 208 may generate the regulation signal based on the output signal and the LDO reference signal. In some embodiments, the regulation signal may be based on the first intermediate signal, the second intermediate signal, or the output signal and the LDO reference signal.

In some embodiments, in the pre-regulation state, the second voltage level of the output signal may be equal to substantially zero volts, which may cause the regulation signal to be equal to substantially zero volts. In other embodiments, in the regulated state or while the system 100 is transitioning from the pre-regulation state to the regulated state, the second voltage level of the output signal may be greater than zero volts, which may cause the regulation signal to be greater than zero volts.

The BGR circuit 218 may be electrically coupled to the UVLO circuit 220. The BGR circuit 218 may receive the regulation signal via the cathode end of the regulation diode 211. Additionally, the BGR circuit 218 may receive the pre-regulation input signal. The BGR circuit 218 may generate the clock reference signal based on the regulation signal and/or the pre-regulation input signal. Additionally, the BGR circuit 218 may generate the LDO reference signal based on the pre-regulation input signal and/or the regulation signal. Furthermore, the BGR circuit 218 may generate a UVLO reference signal based on the pre-regulation input signal and/or the regulation signal.

The UVLO circuit 220 may be electrically coupled to the second switching circuit 214. The UVLO circuit 220 may receive the UVLO reference signal and the regulation signal. In response to receiving the regulation signal, the UVLO circuit 220 may determine whether a voltage level of the regulation signal is within a voltage range. For example, the UVLO circuit may compare a voltage level of the UVLO reference signal to the voltage level of the regulation signal. In some embodiments, the voltage range may be between substantially 4.2 volts and substantially 4.5 volts. If the voltage level of the regulation signal is within the voltage range, the UVLO circuit 220 may generate a switch control signal. The switch control signal may be a DC signal.

The second switching circuit 214 may be electrically coupled to the first switching circuit 212. The second switching circuit 214 may be configured to transition between a closed position and an open position. The second switching circuit 214 may receive the switch control signal. In response to receiving the switch control signal, the second switching circuit 214 may transition to the closed position. In the closed position, the second switching circuit 214 may generate a second switch control signal. The first switching circuit 212 may receive the second switch control signal. In response to receiving the second switch control signal, the first switching circuit 212 may adjust the voltage level of the pre-regulation input signal. In some embodiments, the first switching circuit 212 may adjust the voltage level of the pre-regulation input signal to substantially zero volts. In some embodiments, in response to receiving the switch control signal, the second switching circuit 214 may cause the first switching circuit 212 to transition to the open position (e.g., an electrically non-propagating position).

Each anode end of the diodes 210 may be electrically coupled to a different input line. For example, the anode end of the first diode 210a may be electrically coupled to a first input line. As another example, the anode end of the second diode 210b may be electrically coupled to a second input line. As yet another example, the anode end of the third diode 210c may be electrically coupled to a third input line. Additionally, each of the input lines may provide the input signal to a single stage of the multiple stage voltage converter 106. For example, the first input line may provide the input signal to the first stage of the multiple stage voltage converter 106, the second input line may provide the input signal to the second stage of the multiple stage voltage converter 106, and the third input line may provide the input signal to the third stage of the multiple stage voltage converter 106.

In some embodiments, the diodes 210 may be configured to provide the input signal to the first switching circuit 212. For example, the first diode 210a may be configured to provide the input signal, the second diode 210b may be configured to provide the input signal, and the third diode 210c may be configured to provide the input signal. In some embodiments, only a single diode 210 may provide the input signal at a time. For example, the first diode 210a may provide the input signal to the first switching circuit 212 and the second diode 210b and the third diode 210c may not provide any signal.

In some embodiments, the diode 210 that propagates the input signal may be based on a voltage level of the input signal. For example, if the voltage level of the input signal is greater than or equal to twenty volts and less than or equal to sixty volts, each stage of the multiple stage voltage converter 106 may be used and the first diode 210a may receive the input signal via the first input line. As another example, if the voltage level of the input signal is between ten volts and forty volts, only two stages of the multiple stage voltage converter 106 may be used and the second diode 210b may receive the input signal via the second input line. As yet another example, if the voltage level of the input signal is between five volts and forty volts, a single stage of the multiple stage voltage converter 106 may be used and the third diode 210c may receive the input signal via the third input line.

In some embodiments, a first stage of the multiple stage voltage converter 106 may be configured to receive the input signal between twenty volts and sixty volts. In these and other embodiments, a second stage may be configured to receive the input signal between ten volts and forty volts. Additionally or alternatively, a third stage may be configured to receive a signal between five volts and forty volts In some embodiments, the diode 210 that propagates the input signal may be based on the input voltage range of each stage of the multiple stage voltage converter 106.

Each cathode end of the diodes 210 may prevent the input signal when being provided by a different diode 210 from reaching a different input line (e.g., the diodes 210 may prevent cross talk). For example, if the second diode 210b is providing the input signal, the first diode 210a may prevent the input signal from reaching the first input line and the third diode 210c may prevent the input signal from reaching the third input line. As another example, if the first diode 210a is providing the input signal, the second diode 210b may prevent the input signal from reaching the second input line and the third diode 210c may prevent the input signal from reaching the third input line. As yet another example, if the third diode 210c is providing the input signal, the first diode 210a may prevent the input signal from reaching the first input line and the second diode 210b may prevent the input signal from reaching the second input line.

Additionally, the cathode end of the regulation diode 211 may prevent the pre-regulation input signal, when being provided by the first switching circuit 212, from reaching the LDO circuit 208 (e.g., the regulation diode 211 may prevent cross talk). For example, in the pre-regulation state, the first switching circuit 212 may provide the pre-regulation input signal and the LDO circuit 208 may not generate the regulation signal and the regulation diode 211 may prevent the pre-regulation signal from reaching the LDO circuit 208.

Modifications, additions, or omissions may be made to FIG. 2 without departing from the scope of the present disclosure. For example, while the system 200 is illustrated as including a single multiple stage voltage converter 106, the system 200 may include any number of multiple stage voltage converters 106, such as three multiple stage voltage converters 106 or eight multiple stage voltage converters 106. As another example, while the system 200 is illustrated as including a single LDO circuit 208, the system 200 may include any number of LDO circuits 208, such as three LDO circuits 208 or twelve LDO circuits 208. As an additional example, while the system 200 is illustrated as including a single first switching circuit 212 and a single second switching circuit 214, the system 200 may include any number of first switching circuits 212 and second switching circuits 214, such as two first switching circuits 212 and three second switching circuit 214 or five first switching circuits 212 and two second switching circuits 214. Additionally, while the system 200 is illustrated as including a single oscillator 216, a single BGR circuit 218, and a single UVLO circuit 220, the system 200 may include any number of oscillators 216, BGR circuits 218, and UVLO circuits 220, such as three oscillators 216, four BGR circuits 218, and five UVLO circuits 220 or two oscillators 216, five BGR circuits 218, and four UVLO circuits 220. Furthermore, while the system 200 is illustrated as including three diodes 210, the system 200 may include any number of diodes 210, such as four diodes 210 or seven diodes 210.

Figure 3:
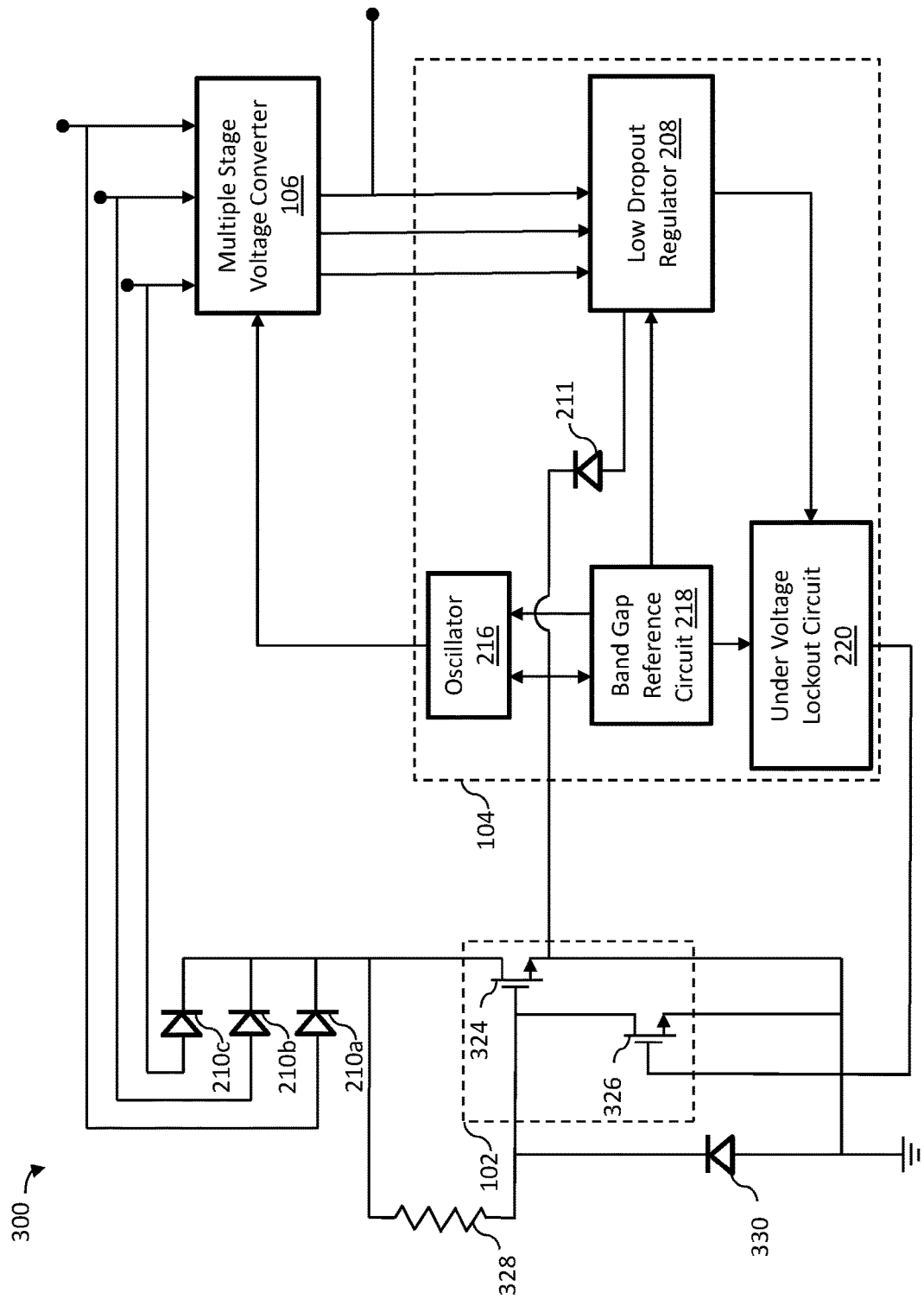
FIG. 3 illustrates an additional example system of electrical components implementing pre-regulation power management.

FIG. 3 illustrates an additional example system 300 of electrical components implementing pre-regulation power management, in accordance with one or more embodiments of the present disclosure. The system 300 may include a switching circuit 102, a regulation circuit 104, and a multiple stage voltage converter 106. The switching circuit 102 may be the same or similar to the switching circuit 102 discussed above in relation to FIGS. 1 and 2. Additionally, the regulation circuit 104 may be the same or similar to the regulation circuit 104 discussed above in relation to FIGS. 1 and 2. Also, the multiple stage voltage converter 106 may be the same or similar to the multiple stage voltage converter 106 discussed above in relation to FIGS. 1 and 2.

The system 300 may include a first diode 210a, a second diode 210b, and a third diode 210c (collectively 'diodes 210'). The diodes 210 may be the same or similar to the diodes 210 discussed above in relation to FIG. 2. Additionally, the system 300 may include a resistive circuit 328 and a switch diode 330 (e.g., a Zener clamp). In some embodiments, the switch diode 330 may include a Zener diode or any other appropriate diode.

The switching circuit 102 may include a first transistor 324 and a second transistor 326. The first transistor 324 may operate the same or similar as the first switching circuit 212 discussed above in relation to FIG. 2. The second transistor 326 may operate the same or similar as the second switching circuit 214 discussed above in relation to FIG. 2. The regulation circuit 104 may include an oscillator 216, a BGR circuit 218, an LDO circuit 208, a regulation diode 211, and a UVLO circuit 220. The oscillator 216 may be the same or similar to the oscillator 216 discussed above in relation to FIG. 2. The BGR circuit 218 may be the same or similar to the BGR circuit 218 discussed above in relation to FIG. 2. The LDO circuit 208 may be the same or similar to the LDO circuit 208 discussed above in relation to FIG. 2. The regulation diode 211 may be the same or similar to the regulation diode 211 discussed above in relation to FIG. 2. The UVLO circuit 220 may be the same or similar to the UVLO circuit 220 discussed above in relation to FIG. 2.

In some embodiments, the first transistor 324 may include a metal-oxide-semiconductor field-effect transistor (MOSFET). For example, the first transistor 324 may include an N-channel MOS (NMOS) transistor. The first transistor 324 may include a gate, a drain, and a source. Additionally, the second transistor 326 may include a MOSFET. For example, the second transistor 326 may include an NMOS transistor. The second transistor 326 may also include a gate, a drain, and a source.

The drain of the first transistor 324 may be electrically coupled to a cathode end of each of the diodes 210 and a second end of the resistive circuit 328. Additionally, the source of the first transistor 324 may be electrically coupled to the oscillator 216, the BGR circuit 218 the source of the second transistor 326, an anode end of the switch diode 330, and ground. Furthermore, the gate of the first transistor 324 may be electrically coupled to the drain of the second transistor 326, a cathode end of the switch diode 330, and a second end of the resistive circuit 328.

The gate of the second transistor 326 may be electrically coupled to the UVLO circuit 220. Additionally, the source of the second transistor 326 may be electrically coupled to the anode end of the switch diode 330 and ground. Furthermore, the drain of the second transistor 326 may be electrically coupled to the cathode end of the switch diode 330, the gate of the first transistor 324, and a first end of the resistive circuit 328.

The first transistor 324 may operate as a switch configured to transition between a closed position (e.g., an electrically conducting or electrically propagating position) and an open position (e.g., an electrically non-conducting or electrically non-propagating position). In the closed position, the first transistor 324 may provide a pre-regulation input signal to the oscillator 216 and the BGR circuit 218 via the source of the first transistor 324. In the open position, the first transistor 324 may not provide the pre-regulation input signal to the oscillator 216 and the BGR circuit 218.

The first transistor 324 may receive an input signal via the drain. The pre-regulation input signal may be based on the input signal as discussed above in relation to FIG. 2.

The BGR circuit 218 may receive the pre-regulation input signal and a regulation signal. The BGR circuit 218 may generate a clock reference signal as discussed above in relation to FIG. 2.

The oscillator 216 may be electrically coupled to the BGR circuit 218 and the multiple stage voltage converter 106. The oscillator 216 may receive the pre-regulation input signal. The oscillator 216 may generate a clock signal based on the pre-regulation input signal, the regulation signal, and/or the clock reference signal as discussed above in relation to FIG. 2. The clock signal may be used to drive components in the multiple stage voltage converter 106 as discussed above in relation to FIG. 2.

The multiple stage voltage converter 106 may be electrically coupled to the LDO circuit 208. Additionally, the multiple stage voltage converter 106 may be electrically coupled to one or more input lines. The multiple stage voltage converter 106 may receive the clock signal and the input signal. The multiple stage voltage converter 106 may generate an output signal and/or one or more intermediate signals as discussed above in relation to FIG. 2. The output signal may be provided to an external electronic device. Additionally, one or more of the intermediate signals and/or the output signal may be provided to the LDO circuit 208.

The LDO circuit 208 may be electrically coupled to the UVLO circuit 220 and an anode end of the regulation diode 211. A cathode end of the regulation diode 211 may be electrically coupled to the oscillator 216 and the BGR circuit 218. The LDO circuit 208 may receive the output signal. Additionally, the LDO circuit 208 may generate the regulation signal based on the output signal and an LDO reference signal as discussed above in relation to FIG. 2.

The BGR circuit 218 may be electrically coupled to the UVLO circuit 220. The BGR circuit 218 may generate the clock reference signal based on the pre-regulation input signal and/or the regulation signal as discussed above in relation to FIG. 2. Additionally, the BGR circuit 218 may generate the LDO reference signal and a UVLO reference signal as discussed above in relation to FIG. 2.

The UVLO circuit 220 may receive the regulation signal and the UVLO reference signal. In response to receiving the regulation signal, the UVLO circuit 220 may determine whether a voltage level of the regulation signal is within a voltage range as discussed above in relation to FIG. 2. If the voltage level of the regulation signal is within the voltage range, the UVLO circuit 220 may generate a switch control signal as discussed above in relation to FIG. 2.

The second transistor 326 may operate as a switch configured to transition between a closed position (e.g., an electrically conducting or electrically propagating position) and an open position (e.g., an electrically non-conducting or electrically non-propagating position). In the open position, the second transistor 326 may operate as an electrical open, which may prevent the gate of the first transistor 324 from being electrically coupled to ground. The second transistor 326 may receive the switch control signal. In response to receiving the switch control signal, the second transistor 326 may transition to the closed position. In the closed position, the second transistor 326 may be configured to electrically couple the gate of the first transistor 324 to ground, which may cause the first transistor 324 to adjust a voltage level of the pre-regulation input signal. For example, the first transistor 324 may adjust the voltage level of the pre-regulation input signal to substantially zero volts.

In some embodiments, the second transistor 326 transitioning to the closed position may cause the first transistor 324 to transition to the open position. The first transistor 324 transitioning to the open position may adjust the voltage level of the pre-regulation input signal to substantially zero volts, which may cause the clock signal to be generated by the oscillator 216 based on the clock reference signal and the regulation since the pre-regulation input signal is not being generated by the first transistor 324 (e.g., the clock signal may be regulated).

In some embodiments, the resistive circuit 328 may operate to bias the switch diode 330. In some embodiments, each of the diodes 210 may be configured to provide the input signal to the first transistor 324 as discussed above in relation to FIG. 2. Additionally, the cathode end of the regulation diode 211 may prevent the pre-regulation input signal, when being provided by the first switching circuit 212, from reaching the LDO circuit 208 (e.g., the regulation diode 211 may prevent cross talk) as discussed above in relation to FIG. 2.

In some embodiments, the switch diode 330 may operate as a Zener clamp (e.g., a voltage regulator) and the resistive element 328 may apply the bias voltage to the switch diode 330 so as to operate at reverse breakdown. For example, the switch diode 330 may operate to regulate a voltage level of the signal at the gate of the first transistor 324. In some embodiments, the voltage level of the signal at the gate of the first transistor 324 may be regulated to be equal to or less than five and a half volts. In other embodiments, the voltage level of the signal at the gate of the first transistor 324 may be regulated to be equal to or less than five volts.

Modifications, additions, or omissions may be made to FIG. 3 without departing from the scope of the present disclosure. For example, while the system 300 is illustrated as including a single multiple stage voltage converter 106, the system 300 may include any number of multiple stage voltage converters 106, such as two multiple stage voltage converters 106 or nine multiple stage voltage converters 106. As another example, while the system 300 is illustrated as including a single LDO circuit 208, the system 300 may include any number of LDO circuits 208, such as two LDO circuits 208 or eleven LDO circuits 208. As an additional example, while the system 300 is illustrated as including a single first transistor 324 and a single second transistor 326, the system 300 may include any number of first transistors 324 and second transistors 326, such as two first transistors 324 and three second transistors 326 or five first transistors 324 and two second transistors 326. Additionally, while the system 300 is illustrated as including a single oscillator 216, a single BGR circuit 218, and a single UVLO circuit 220, the system 300 may include any number of oscillators 216, BGR circuits 218, and UVLO circuits 220, such as two oscillators 216, three BGR circuits 218, and six UVLO circuits 220 or four oscillators 216, four BGR circuits 218, and four UVLO circuits 220. Furthermore, while the system 300 is illustrated as including three diodes 210, the system 300 may include any number of diodes 210, such as five diodes 210 or nine diodes 210. Also, while the system 300 is illustrated as including a single switch diode 330, the system 300 may include number of switch diodes 330, such as two switch diodes 330 or eight switch diodes 330.

Figure 4:
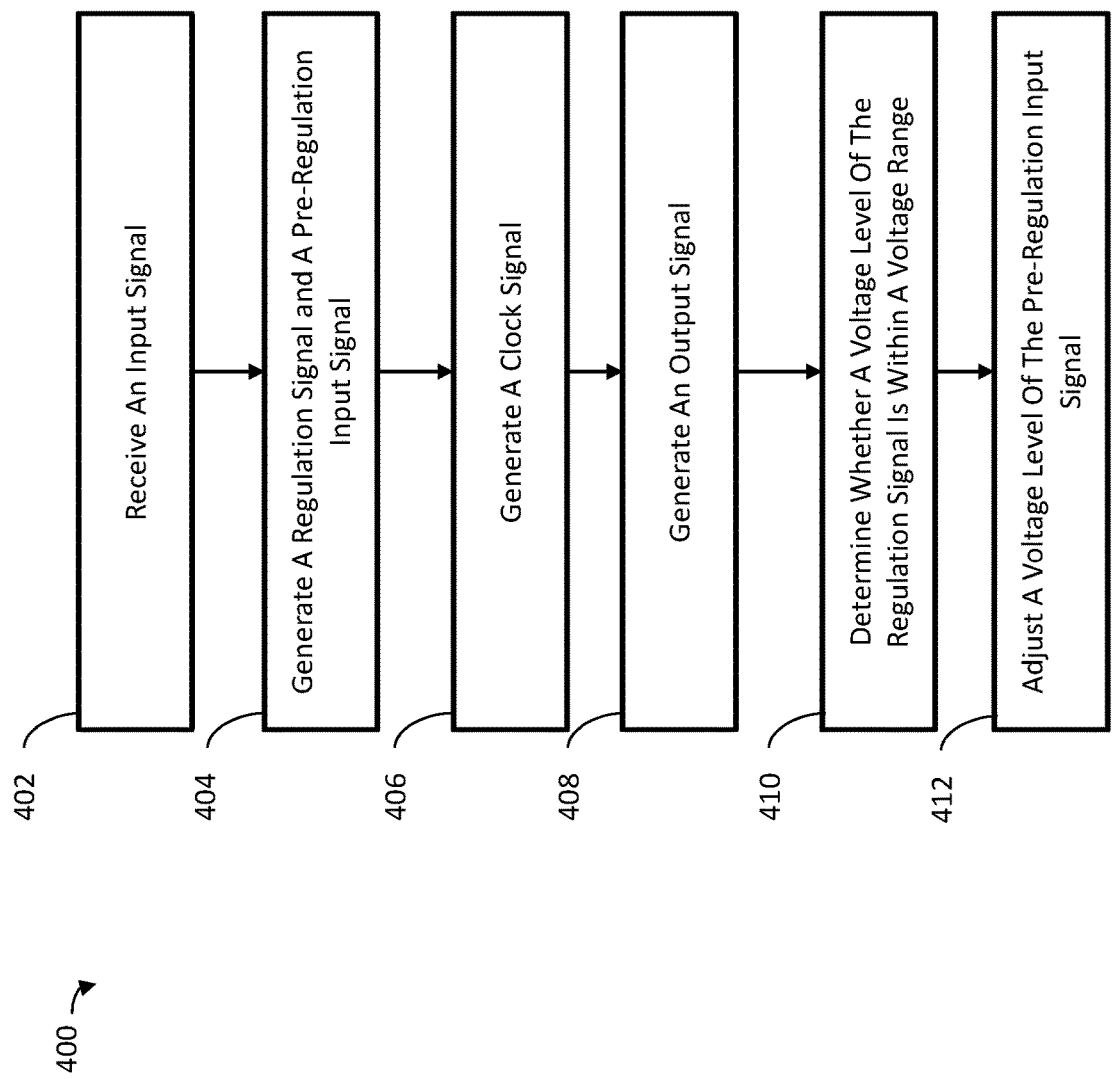
FIG. 4 illustrates a flowchart of an example method of pre-regulation power management.

FIG. 4 illustrates a flowchart of an example method 400 of pre-regulation power management according to at least one embodiment described in the present disclosure. The method 400 may be performed by any suitable system, apparatus, or device. For example, the systems, 100, 200, and 300 of FIGS. 1-3 may perform or direct performance of one or more of the operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may include a block 402, at which an input signal may be received. The input signal may be received by a switching circuit, such as the switching circuit 102 of FIG. 1. The input signal may be an unregulated electrical signal. In some embodiments, the input signal may also be received by a multiple stage voltage converter, such as the multiple stage voltage converter 106 of FIG. 1.

At block 404, a pre-regulation input signal and a regulation signal may be generated. The pre-regulation input signal may be based on the input signal. For example, the pre-regulation input signal may be generated (e.g., provided) by a switching circuit, such as the switching circuit 102 of FIG. 1. The regulation signal may be based on an output signal. For example, the regulation signal may be generated by an LDO circuit, such as the LDO circuit 208 of FIG. 1. In some embodiments, the regulation signal may indicate a voltage level of the output signal.

At block 406, a clock signal may be generated. The clock signal may be generated based on the pre-regulation input signal and/or the regulation signal. In some embodiments, the clock signal may be generated by a regulation circuit, such as the regulation circuit 104 of FIG. 1. In some embodiments, a clock reference signal may be generated based on the pre-regulation input signal and/or the regulation signal. In these and other embodiments, the clock signal may be based on the pre-regulation input signal, the regulation signal, and/or the clock reference signal.

At block 408, the output signal may be generated. The output signal may be generated based on the input signal using the clock signal. In some embodiments, the output signal may be generated by the multiple stage voltage converter, such as the multiple stage voltage converter 106 of FIG. 1. Additionally, the regulation signal may be based on the output signal.

At block 410, it may be determined whether a voltage level of the regulation signal is within a voltage range. In some embodiments, the voltage level of the regulation signal may be determined by the regulation circuit, such as the regulation circuit 104 of FIG. 1. In response to determining that the voltage level of the regulation signal is within the voltage range, the method 400 may proceed to block 412. At block 412, a voltage level of the pre-regulation input signal may be adjusted. For example, the voltage level of the pre-regulation input signal may be adjusted so as to be substantially zero volts. In some embodiments, the voltage level of the pre-regulation input signal may be adjusted by a switching circuit, such as the switching circuit 102 of FIG. 1.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

In accordance with common practice, the various features illustrated in the drawings may not be drawn to scale. The illustrations presented in the present disclosure are not meant to be actual views of any particular apparatus (e.g., device, system, etc.) or method, but are merely representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," among others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A system comprising:
a switching circuit configured to:
  receive an input signal; and
  generate a pre-regulation input signal based on the input signal;
a multiple stage voltage converter configured to:
  receive a clock signal and the input signal; and
  generate an output signal based on the input signal using the clock signal;
a regulation circuit electrically coupled to the switching circuit and the multiple stage voltage converter, the regulation circuit configured to:
  receive the output signal and the pre-regulation input signal; and
  generate a regulation signal based on the output signal;
  generate a clock reference signal based on at least one of the pre-regulation input signal and the regulation signal; and
  generate the clock signal based on at least one of the pre-regulation input signal, the regulation signal, and the clock reference signal, wherein the regulation circuit is configured to determine whether a voltage level of the regulation signal is within a voltage range, and if the voltage level of the regulation signal is within the voltage range the regulation circuit is configured to generate a switch control signal and the switching circuit is configured to receive the switch control signal and to adjust a voltage level of the pre-regulation input signal based on the switch control signal.

2. The system of claim 1, the regulation circuit comprising a bandgap reference (BGR) circuit electrically coupled to the switching circuit, the BGR circuit configured to:
receive the regulation signal and the pre-regulation input signal; and
generate the clock reference signal based on at least one of the pre-regulation input signal and the regulation signal.

3. The system of claim 2, the regulation circuit further comprising an oscillator electrically coupled to the switching circuit, the BGR circuit, and the multiple stage voltage converter, the oscillator configured to:
receive the clock reference signal, the pre-regulation input signal, and the regulation signal; and
generate the clock signal based on at least one of the pre-regulation input signal, the regulation signal, and the clock reference signal.

4. The system of claim 3, wherein the BGR circuit is further configured to generate a under voltage lockout (UVLO) reference signal based on at least one of the pre-regulation input signal and the regulation signal, the regulation circuit further comprising a UVLO circuit electrically coupled to the BGR circuit; and the switching circuit, the UVLO circuit configured to:
receive the UVLO reference signal and the regulation signal; and
determine whether the voltage level of the regulation signal is within the voltage range; and
in response to the voltage level of the regulation signal being within the voltage range, generate the switch control signal.

5. The system of claim 4, wherein the BGR circuit is further configured to generate a low dropout regulator (LDO) reference signal based on at least one of the pre-regulation input signal and the regulation signal, the regulation circuit further comprising an LDO circuit electrically coupled to the oscillator, the BGR circuit, the UVLO circuit, and the multiple stage voltage converter, the LDO circuit configured to:
receive the output signal and the LDO reference signal; and
generate the regulation signal based on the output signal and the LDO reference signal.

6. The system of claim 1, the switching circuit comprising:
a second switching circuit electrically coupled to the regulation circuit, the second switching circuit configured to:
receive the switch control signal; and
generate a second switch control signal based on the switch control signal; and
a first switching circuit electrically coupled to the second switching circuit, the first switching circuit configured to:
receive the input signal and the second switch control signal; and
adjust the voltage level of the pre-regulation input signal based on the second switch control signal.

7. The system of claim 6, wherein the first switching circuit comprises a metal-oxide-semiconductor field-effect transistor (MOSFET) comprising a gate, a drain, and a source.

8. The system of claim 7, wherein the second switching circuit is configured to electrically couple the gate of the first switching circuit to ground to cause the first switching circuit to be in an open position.

9. The system of claim 8 further comprising:
a resistive circuit electrically coupled to the switching circuit; and
a diode electrically coupled to the first switching circuit, a second end of the resistive circuit, and ground, wherein the diode is configured to operate as a Zener clamp and the resistive circuit is configured to provide a bias voltage to the diode.

10. The system of claim 9 further comprising a diode comprising an anode end and a cathode end, wherein the cathode end is electrically coupled to the switching circuit and a first end of the resistive circuit and the anode end is configured to receive the input signal.

11. The system of claim 1, wherein the multiple stage voltage converter is configured to generate a first intermediate signal, a second intermediate signal, and a third intermediate signal, wherein the first intermediate signal, the second intermediate signal, and the third intermediate signal are based on the input signal using the clock signal.

12. The system of claim 11, wherein the output signal comprises at least one of the first intermediate signal, the second intermediate signal, and the third intermediate signal.

13. The system of claim 12 further comprising:
a first diode electrically coupled to an input line of a first stage of the multiple stage voltage converter and the switching circuit;
a second diode electrically coupled to an input line of a second stage of the multiple stage voltage converter and the switching circuit; and
a third diode electrically coupled to an input ling of a third stage of the multiple stage voltage converter and the switching circuit.

14. A method, comprising:
receiving an input signal;
generating a regulation signal and a pre-regulation input signal based on the input signal;
generating a clock signal based on at least one of the pre-regulation input signal and the regulation signal;
generating an output signal based on the input signal using the clock signal, wherein the regulation signal is based on the output signal; and
determining whether a voltage level of the regulation signal is within a voltage range; and
in response to the voltage level of the regulation signal being within the voltage range, adjusting a voltage level of the pre-regulation input signal.

15. The method of claim 14 further comprising generating a clock reference signal based on at least one of the pre-regulation input signal and the regulation signal, wherein the clock signal is further based on the clock reference signal.

16. The method of claim 14 wherein the voltage level of the pre-regulation input signal is adjusted based on a switch control signal.

17. The method of claim 14 further comprising generating a first intermediate signal, a second intermediate signal, and a third intermediate signal, wherein the output signal comprises at least one of the first intermediate signal, the second intermediate signal, and the third intermediate signal, wherein the first intermediate signal, the second intermediate signal, and the third intermediate signal are based on the input signal using the clock signal.

18. A system comprising:
a first switching circuit configured to:
receive an input signal; and generate a pre-regulation input signal based on the input signal;
an oscillator electrically coupled to the first switching circuit, the oscillator configured to:
receive a clock reference signal, the pre-regulation input signal, and a regulation signal; and
generate a clock signal based on at least one of the pre-regulation input signal, the regulation signal, and the clock reference signal;
a BGR circuit electrically coupled to the oscillator and the first switching circuit, the BGR circuit configured to:
receive the regulation signal and the pre-regulation input signal;
generate the clock reference signal based on at least one of the pre-regulation input signal and the regulation signal; and
generate a UVLO reference signal and an LDO reference signal based on the regulation signal;
a multiple stage voltage converter electrically coupled to the oscillator, the multiple stage voltage converter configured to:
receive the clock signal and the input signal; and
generate an output signal based on the input signal using the clock signal;
an LDO circuit electrically coupled to the multiple stage voltage converter, the BGR circuit, and the oscillator, the LDO circuit configured to:
receive the output signal and the LDO reference signal; and
generate the regulation signal based on the output signal and the LDO reference signal;
a UVLO circuit electrically coupled to the LDO circuit and the BGR circuit, the UVLO circuit configured to:
receive the UVLO reference signal and the regulation signal; and
determine whether a voltage level of the regulation signal is within a voltage range; and
in response to the voltage level of the regulation signal being within the voltage range, generate a switch control signal,
a second switching circuit electrically coupled to the UVLO circuit and the first switching circuit, the second switching circuit configured to:
receive the switch control signal; and
generate a second switch control signal, wherein the first switching circuit is configured to receive the second switch control signal and adjust a voltage level of the pre-regulation input signal based on the second switch control signal.

19. The system of claim 18, wherein the first switching circuit comprises a MOSFET comprising a gate, a drain, and a source and the second switching circuit is configured to electrically couple the gate of the first switching circuit to ground to cause the first switching circuit to be in an open position.

20. The system of claim 18 further comprising:
a resistive circuit electrically coupled to the first switching circuit;
a diode electrically coupled to the first switching circuit, a second end of the resistive circuit, and ground, wherein the diode is configured to operate as a Zener clamp and the resistive circuit is configured to provide a bias voltage to the diode;
a first diode electrically coupled to an input line of a first stage of the multiple stage voltage converter, a second end of the resistive circuit, and the first switching circuit;
a second diode electrically coupled to an input line of a second stage of the multiple stage voltage converter, a second end of the resistive circuit, and the first switching circuit; and
a third diode electrically coupled to an input line of a third stage of the multiple stage voltage converter, a second end of the resistive circuit, and the first switching circuit.

* * * * *